M. H. Collins.
Armor Clad.
No. 40,535. Patented Nov. 3, 1863.
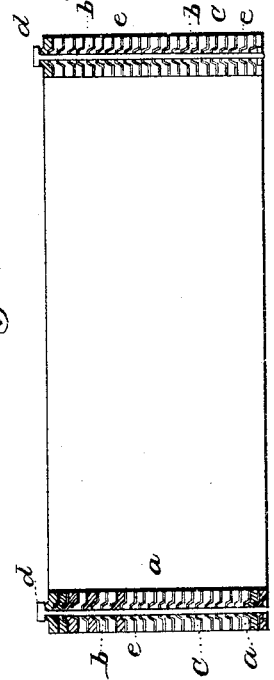
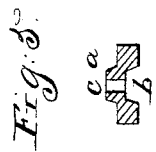
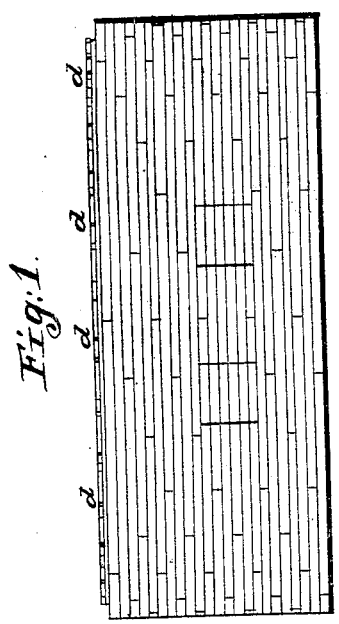
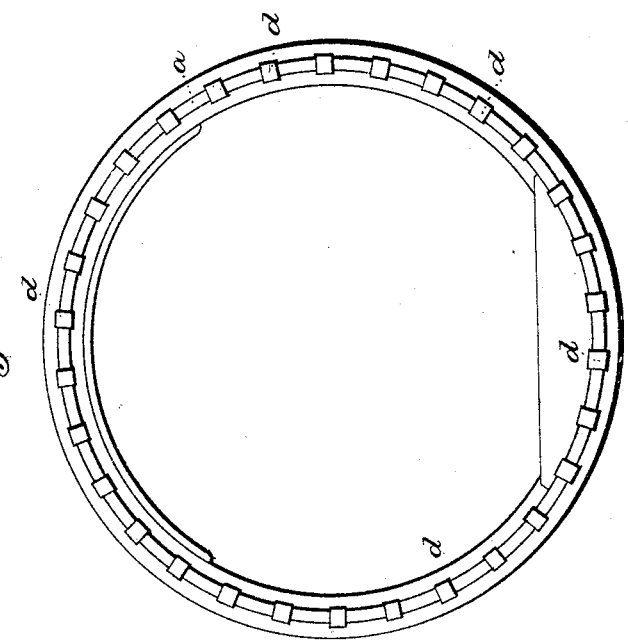
Witnesses:
F. R. Hale Jr
Frederick Curtis.
Inventor:
Michael H. Collins

UNITED STATES PATENT OFFICE.

MICHAEL H. COLLINS, OF CHELSEA, MASSACHUSETTS, ASSIGNOR TO HIMSELF, GEO. BUTTERFIELD, AND WM. A. RICHARDSON.

IMPROVED MONITOR-TURRET.

Specification forming part of Letters Patent No. 40,535, dated November 3, 1863.

*To all whom it may concern:*

Be it known that I, MICHAEL H. COLLINS, a resident of Chelsea, in the county of Suffolk and State of Massachusetts, have invented an Improved Battery or Turret for Monitors or Armored Vessels or for Forts; and I do hereby declare the same to be fully described in the following specification, and represented in the accompanying drawings, of which—

Figure 1 denotes a side elevation, Fig. 2, a transverse section, and Fig. 3 a top view, of the said turret. Fig. 4 is a top view, and Fig. 5 a transverse section, of one of the circular or curved segments used in the construction of such turret.

In making the said turret I do not employ curved plates of iron arranged in concentric layers, and having bolts going through the layers horizontally, but I make use of several series of annular segments of the kind shown in Figs. 4 and 5, each segment being made not only with a tongue, $a$, projecting from one side of it, but with a corresponding groove, $b$, formed in the opposite side of it, and so that when one segment is laid on the other flatwise the tongue of one shall enter the groove of the other. The segments of each series or layer of the turret I arrange together end to end until they form a complete circle or annulus, the flat sides of the segments being horizontal. Extending vertically through each segment is a series of holes, $c\ c\ c$, which are disposed at equal distances asunder. The turret is to be composed of several of such series of segments, one series being laid upon another, and with the segments of one series overlapping the joints of the next series below, each of the holes $c\ c\ c$ of one series being respectively over and in line with one of those of the other. Iron bolts $d\ d\ d$ are to be passed vertically down through the several layers or through their sets of holes $c$, and so as to clamp or confine the whole of the layers firmly together, and prevent them from being spread apart by the impact of a shot or projectile when discharged against the turret.

Between each two of the layers segments $e\ e$, of felt, cloth, or other non-resonant material, may be placed, the same being for the purpose of more or less preventing vibration of the metal of the turret when struck by a projectile, or when subjected to the concussion produced by the discharge of a gun placed on or about the turret. This felt or non-resonant material may be saturated or covered with tar, pitch, or any suitable water-proof cement, the same serving not only to make the joints of the turret tight or impervious to water, but to protect the adjacent surfaces of the metal from oxidation.

The tongues and grooves by their arrangement receive more or less of the strains induced by impact of a projectile, and they serve to protect the bolts from becoming broken by such, leaving to the bolts the office of preventing the spreading apart of the layers.

My mode of construction of a turret presents great advantages, so far as repairing of the turret is concerned, as it enables the whole turret to be readily taken apart, and the injured segments removed and perfect ones substituted for them. Furthermore, it enables a turret to be taken apart, and the whole or any part of it to be stowed away, either below or on deck or out of the way, until it may be needed for war purposes. The arrangement of the bolts within the turret is such that during an engagement and in consequence of the turret being struck by a shot they cannot fly out of their holes so as to do injury to persons within the turret, as frequently occurs when the bolts go horizontally through the sides of the turret, and it is made of iron plates arranged in concentric-layers, as the monitor-turrets now in use are constructed.

The ports of the turret may be cut through it in manner as those of the monitor turrets are formed.

I claim—

1. The improved battery, fort, or monitor turret, as constructed of a series of annular segments made, arranged, and confined together substantially in manner as represented in the accompanying drawings, and as hereinbefore described.

2. A turret as so made, and having felt or other suitable non-vibratory or non-resonant material interposed between the layers of annular segments, substantially as and for the purpose as specified.

M. H. COLLINS.

Witnesses:
  R. H. EDDY,
  F. P. HALE, Jr.